United States Patent
Michael et al.

(10) Patent No.: US 9,641,990 B2
(45) Date of Patent: May 2, 2017

(54) SYSTEM AND METHOD FOR UNINTERRUPTED TRANSFER OF CALLS BETWEEN CELLULAR AND WIFI NETWORKS

(71) Applicant: Jeffrey Michael, Reno, NV (US)

(72) Inventors: Jeffrey W Michael, Reno, NV (US); William Sikkens, Reno, NV (US)

(*) Notice: Subject to any disclaimer, the term of this patent is extended or adjusted under 35 U.S.C. 154(b) by 0 days.

(21) Appl. No.: 14/804,437

(22) Filed: Jul. 21, 2015

(65) Prior Publication Data
US 2016/0029189 A1   Jan. 28, 2016

Related U.S. Application Data

(60) Provisional application No. 62/028,292, filed on Jul. 23, 2014.

(51) Int. Cl.
| | | |
|---|---|---|
| *H04M 3/42* | (2006.01) |
| *H04W 4/16* | (2009.01) |
| *H04W 28/08* | (2009.01) |
| *H04W 76/02* | (2009.01) |
| *H04W 88/06* | (2009.01) |
| *H04W 84/12* | (2009.01) |

(52) U.S. Cl.
CPC ............ *H04W 4/16* (2013.01); *H04W 28/08* (2013.01); *H04W 76/026* (2013.01); *H04W 84/12* (2013.01); *H04W 88/06* (2013.01)

(58) Field of Classification Search
CPC ...................................... H04W 4/16
See application file for complete search history.

(56) References Cited

U.S. PATENT DOCUMENTS

2006/0217112 A1* 9/2006 Mo ............... H04W 36/14
                                                    455/422.1

* cited by examiner

*Primary Examiner* — Idowu O Osifade
(74) *Attorney, Agent, or Firm* — Marc D. Foodman

(57) ABSTRACT

A system and method for transferring calls without interruption between a cellular network and a WiFi network. The system includes smartphones and other mobile devices (e.g. tablet computers) connected to a network and running an application installed on the mobile devices to perform the functions for making the uninterrupted transfer of calls between a cellular network and a WiFi network or vice versa.

6 Claims, 7 Drawing Sheets

SYSTEM AND METHOD FOR UNINTERRUPTED TRANSFER OF CALLS BETWEEN CELLULAR AND WIFI NETWORKS

RELATED APPLICATION INFORMATION

This application claims priority benefit from U.S. Provisional Application Ser. No. 62/028,292, filed on Jul. 23, 2014.

COPYRIGHT NOTICE

Portions of this disclosure contain material in which copyright is claimed by the applicant. The applicant has no objection to the copying of this material in the course of making copies of the application file or any patents that may issue on the application, but all other rights whatsoever in the copyrighted material are reserved.

BACKGROUND

Cellular phones have been in widespread use for many years. A variety of carriers offer cellular services over networks in the United States and similar services are offered by cellular companies in most other countries around the world. The coverage of the networks of the different carriers varies widely depending on the geographic location of the user. Coverage depends on the proximity to a cellular tower delivering a cell signal to a user's mobile device. If a user is in a location that is too far away from a tower or that is blocked in some way from receiving the signal from a tower, the call quality may be reduced to an unacceptable level or drop off completely.

Cell phone users are typically charged a monthly service fee for the use of a phone on the cellular network. Those charges depend on the amount of use and are usually measured in the number of minutes during each monthly cycle. To avoid running up charges and/or to improve signal reception, a number of products and services have been offered to transfer a cellular call on a cell phone from the cellular network to another network such as a hardwired telephone network or a WiFi network that allows the call to be transmitted over the internet or another network.

While different products and services offering these transfer capabilities are available, none of them offers a seamless transfer which is accomplished without the user manually initiating such action. As a result, it is desirable to have such a system and method that automatically transfers calls from a cellular network upon a user coming into range of a WiFi network.

The present invention overcomes the deficiencies of the prior art by offering a software package that may run on any number of different operating systems including but not limited to Android, OS, Windows, Windows Mobile, Linux or Blackberry. The application provides voice over internet protocol (VoIP) telephone services designed to supplement and/or replace the existing cellular PCS or packet communication system.

BRIEF DESCRIPTION OF THE DRAWINGS

For a better understanding of the present invention, and to describe its operation, reference will now be made, by way of example, to the accompanying drawings. The drawings show preferred embodiments of the present invention in which.

DETAILED DESCRIPTION OF THE INVENTION

Figure 1:
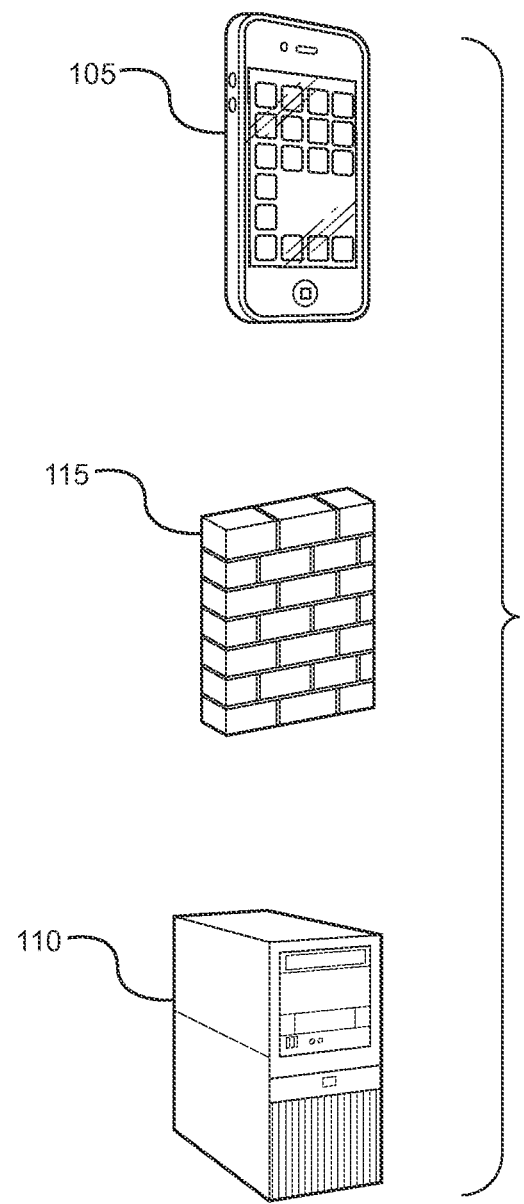
FIG. 1 shows the system components that operate to transfer calls without interruption between a cellular network and a WiFi network.
Figure 2:
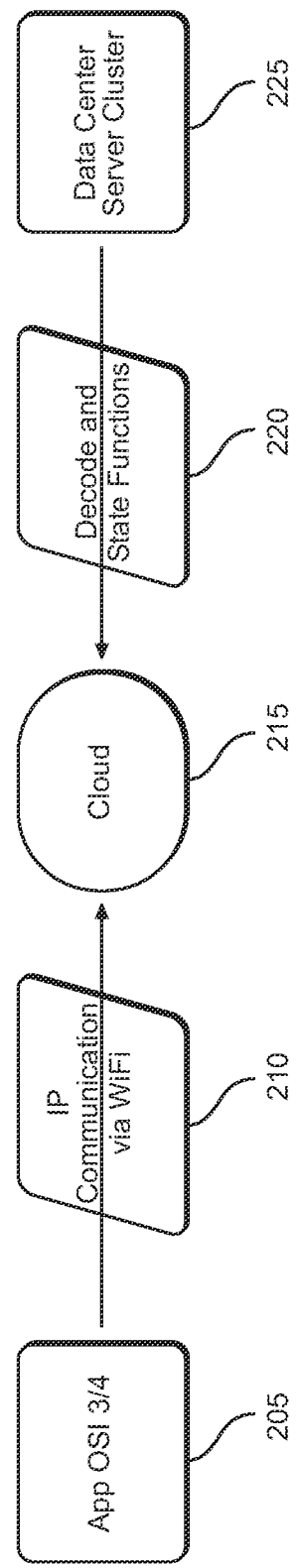
FIG. 2 shows the communication process between an application running on a mobile device and a server via the cloud to transfer calls without interruption between a cellular network and a WiFi network.

The present invention will now be described more fully with reference to the accompanying drawings. It should be understood that the invention may be embodied in many different forms and should not be construed as limited to the embodiments set forth herein. Throughout the Figures, like elements of the invention are referred to by the same reference numerals for consistency purposes.

Shown in FIGS. 1-7 is a system and method for transferring calls without interruption between a cellular network and a WiFi network. FIG. 1 shows the basic system components which include one or more mobile devices 105 such as a smartphone or other portable computing device (e.g. tablet computers, laptops, PDAs, etc.) connected to a network and running an application ("app") installed on the mobile device 105 to perform the functions for the uninterrupted transfer of calls between a cellular network and a WiFi network or vice versa. One or more servers 110 control call sessions and a firewall and load balancing system 115 authenticates a user's mobile device prior to making a transfer.

A specific application ("app"—see FIG. 2) is installed on mobile device 105 that operates in conjunction with software installed on servers 110 and load balancing system 115 to enable calls to be transferred. The app provides voice communications and simple messaging service (SMS) functions via WiFi conforming to IEEE 802.11 standards, functioning with all subversions of the standard in production or in prototype. The IEEE definition of sub OSI—(Open Systems Interconnection model—a conceptual model that characterizes and standardizes the internal functions of a communication system by partition it into layers) for 802.11 includes A, B, G, N, AB and AC. Because the application is adherent to full 802.11, any additional sub OTI will be supported.

The communication level of the app may be defined by the equipment manufacturer, which for example, may be based on the open systems interconnection ("OSI") model as defined by CISCO® at:
http://www.ciscopath.com/reference/oci-model-tcpip-model The app, along with the cloud infrastructure, operates at Level 2 of the OSI model, which is the data link layer, conforming to IPv4 and IPv6 (Internet Protocol versions 4 and 6) standards, and the communication operates at the transport level, Level 3, as either transmission control protocol ("TCP") or user datagram protocol ("UDP") with TCP being the preferred transport flow control. In a preferred embodiment, system 300 will first attempt to operate with TCP and then use UDP if TCP is unavailable. The app operates as a service level system on supported devices allowing automatic startup and background operation FIG. 2. shows the communication process in which App OSI layers 3 and 4 is shown at block 205 and refers to the communication layers of the App (TCP and IP) 205 which communicate via the IP network 210 (WiFi is illustrated, but this could be any packet based network including satellite). The session is then transferred using a standard cloud process 215.

On the server side, server software maintains session state; that is control of the call. A "Decode and State Functions" block 220 are outlined herein as part of the process formula. Switching and physical control functions are maintained at a data center server cluster 225. This process may be replicated at multiple data centers or single center capacity may be increased to increase overall system capacity.

App 205 refers to OSI layers 3 and 4, commonly TCP and IP, although UDP is also supported at layer 3 of OSI. This is the application itself that is installed to mobile device 105. IP communication 210 is the physical network component that connects mobile device 105 to cloud 215. This is commonly a WiFi network although any packet based standard network that conforms to OSI referenced above is usable. WiFi networks may include the public network at a restaurant or other commercial place as well as an office, home or tethered configuration. In addition to WiFi, Satellite, WAN, MAN and any other packet infrastructure is or can be supported.

Cloud 215 is the public Internet while decode and state functions 220 are determined at the front end of server 110 at data center 225. State control is handled at decode and state functions block 220 which allows signal detection, also referred to by trademark "Signal Seeker" to monitor the call and switch (handoff between networks) as needed. This process must be completed at 2 ms or less to avoid drops. The decode (and encode) function 220 refers to a variance for the subscribers mobile network. Information being decoded includes the DID number, connection state (connected, connecting, etc.) as well as status such as roaming and signal strength.

Data center server cluster 225 is the physical data center configuration. This is illustrated in detail in FIG. 5.

Figure 3:
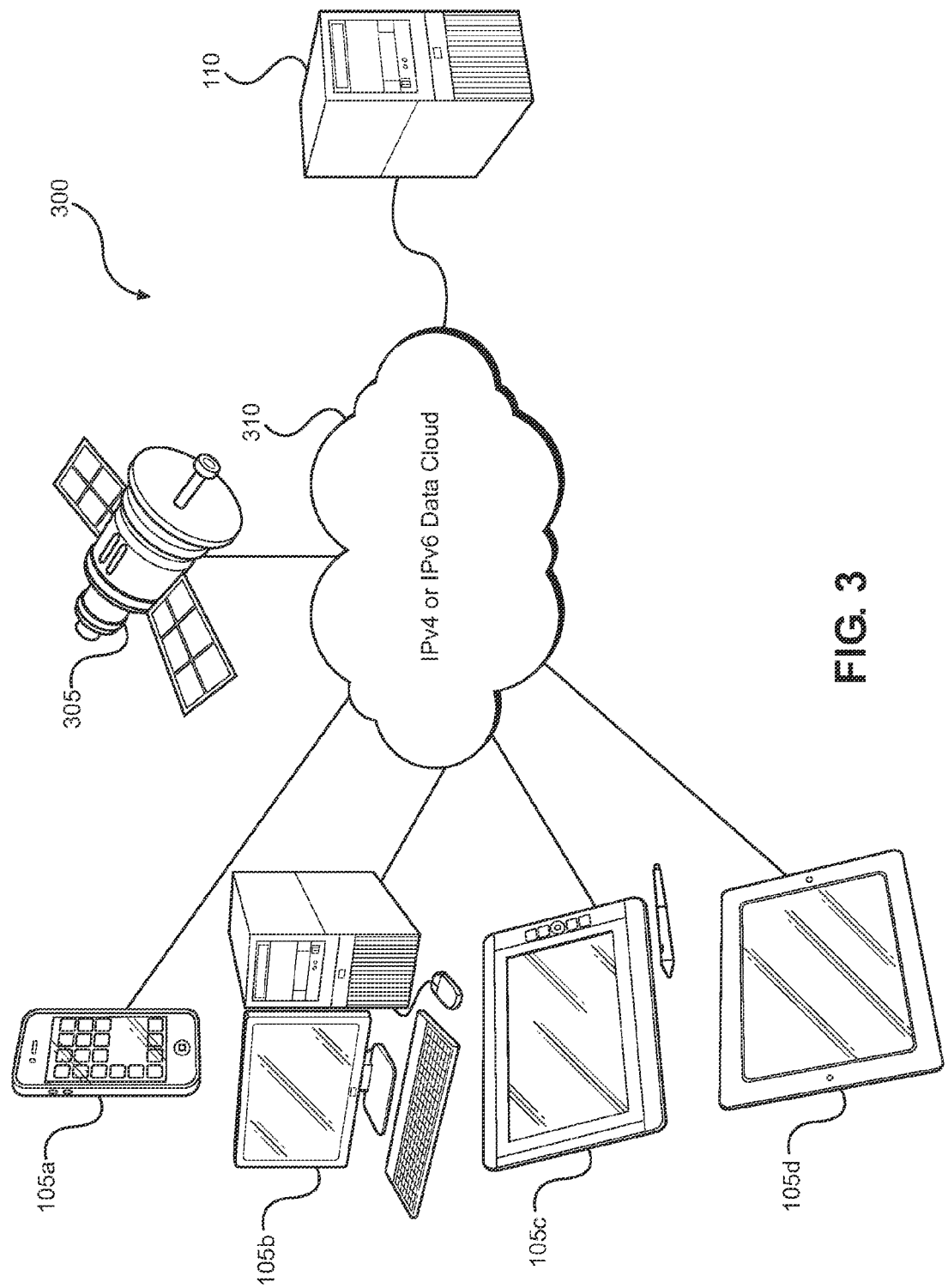
FIG. 3 shows the connections between the different components operating in a system and method for transferring calls without interruption between a cellular network and a WiFi network.

FIG. 3 shows the connections between the different components of a system 300 for transferring calls without interruption between a cellular network represented by satellite transceiver 305 and a WiFi network 310. The cellular network may carry cellular communications, cellular data (3G, 4G, etc.), wireless networks, satellite networks and/or any other packet based communication system. A number of mobile devices 105a-d are shown including a smartphone 105a, a desktop computer 105b, a tablet computer 105c and a smart TV 105d. It should be understood that other devices such as any wearable device like GOOGLE® GLASS, BROTHER® Eyeglasses and any wearable or glasses based system using a heads up display or internal lens design, smart watches, or any other connected device will also work in the system.

Mobile devices 105 may run any number of different operating systems including but not limited to Android, iOS, Windows, Windows Mobile, Linux or Blackberry. App 205 running on mobile devices 105a-d functions to transfer an active call between cellular packet system 305 and WiFi system 110. App 205 is implemented in an active state format on mobile device 105 and monitors communications in an active/inactive mode on packet system 305. When a WiFi signal is detected in range of mobile device 105 that is able to route calls over the internet or another platform including but not limited to a private packet switch, extranet, local area network, municipal area network, wide area network satellite network using any one or more frequency bands (e.g. L, C, Ku, Ka), cellular network (e.g. GSM, CDMA), App 205 initiates a connection on the cloud network 310 and drops the connection to cellular packet system 305. This system additionally maintains state functions for call completion allowing a transfer of originated point of termination by both cellular packet system 305 and WiFi system 110 communicating over cloud network 310.

App 205 employs several quality of service features ("QOS") designed to address and minimize the issue of dropped calls. Included in this feature is a signal monitoring function which will obtain active/inactive state of WiFi network 110, check the login status and once access is confirmed, monitor the signal level of cell network 305. Once a WiFi signal strength in a range of approximately 0.5 db to 0.8 db is obtained for a period of 5 seconds, app 205 is triggered to transfer to cloud 310.

In addition to the auto transfer, the user has a function via the interface on app 205 to enable the user to manually set the signal strength and time for switching.

Once a cellular network signal reaches the minimum level that is the default value or as set by the user, the active call is switched back to cellular packet system 305 until the process may be repeated. The entire switching process completes in under 2 ms.

The design of the signal detection process is set to control the call via server 110, and monitor for the status of mobile device 105. When a call is active on cellular network 305 and a known wireless connection is successfully engaged, server 110 will hand off (or switch) the active call from cell network 305 to WiFi network 310 and stop incurring further charges for cellular minutes. The call on cellular network 305 is placed in standby mode which allows the system the ability to switch it back to cellular network 305 quickly and easily. The state of the document type definition ("DTD") (phone number) is kept in standby so the call session may continue without interruption.

Another quality of service ("QOS") function involves monitoring of "hops" and other latency issues on WiFi network 310 allowing for full support of satellite and other Internet communication technologies. This feature makes the app along with the Cloud infrastructure agnostic to the actual form of communication for the wide area network (i.e. as long as the device end conforms to IEEE 802.11, whatever technology completes the circuit is supported. This may include, but is not limited to, satellite packet radio, switched data such as T1 or T3, cable modems, DSL, Fiber Optic Connections, etc.).

Device support of the app and the cloud based infrastructure supports all current implementations that communicate with the internet protocol version X ("IPvX") standards. This includes, but is not limited to, Android devices (all), iOS devices (all), Windows mobile devices (all), Blackberry devices (all) and WebOS devices. While the product app will focus on specific device operating systems based on market share, it is declared that the technology itself is compatible with all IP compliant device operating systems.

Figure 4:
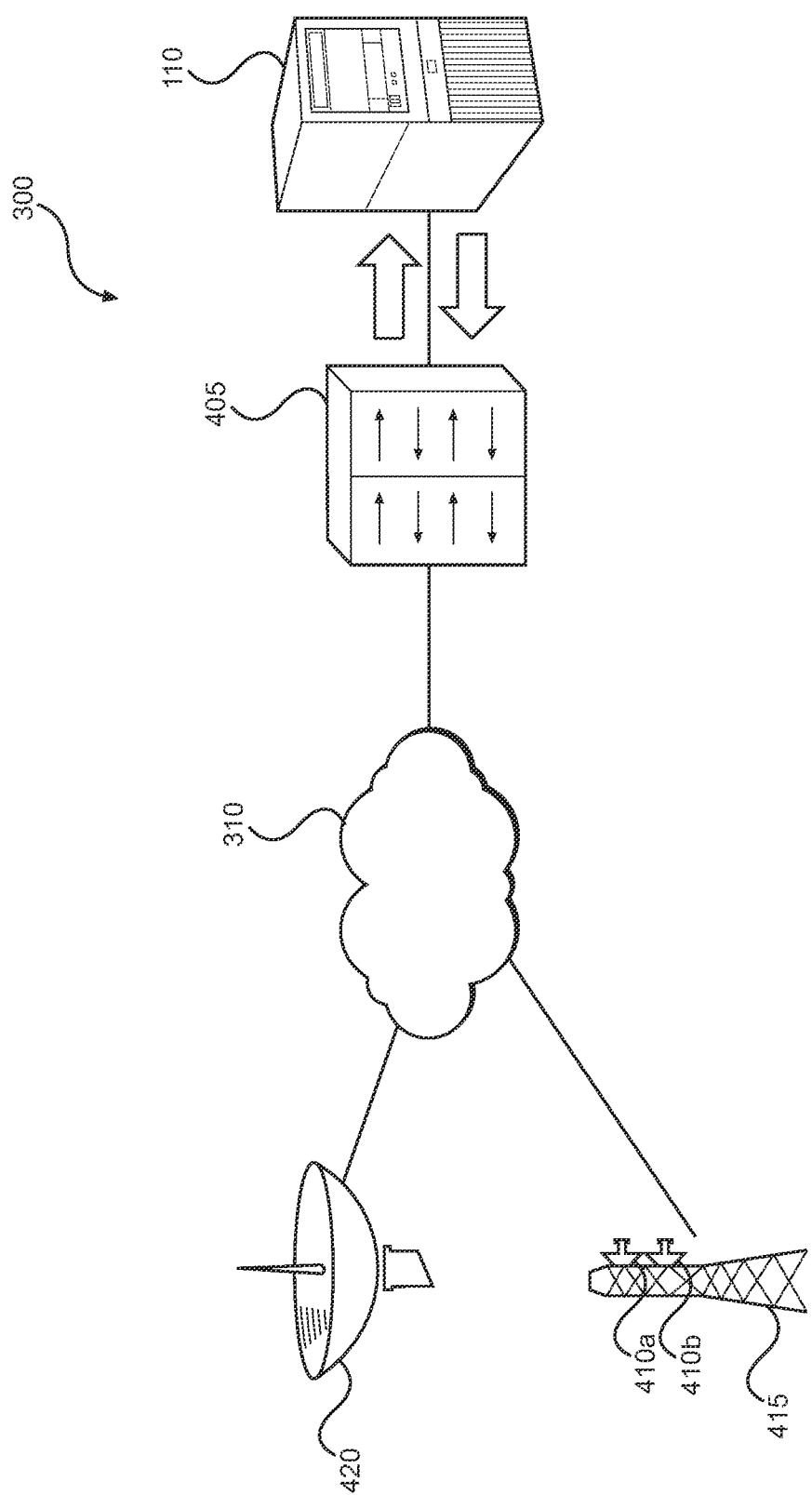
FIG. 4 shows the point of receipt at an internet server for controlling calls in a system and method for transferring calls without interruption between a cellular network and a WiFi network, along with a load balancing array.

System 300 is unique and different from anything on the market today. Call transfer is performed without the device user being interrupted or having to interact in any way with mobile device 105. The app's internal algorithmic structure analyzes, identifies, determines and implements the best form of connection to adhere to the device users' needs and current activities. The system is also agnostic to branded carrier environments and will support cellular packet implementation on both the global system for mobile communications ("GSM") and code division multiple access ("CDMA") switching standards FIG. 4 shows the point of receipt at internet server 110 for controlling calls on system 300. In between cloud server 110 and cloud 310 is configured with a load balancing array 405. Load balancing array 405 is a monitor that operates in front of server 110 to maintain consistent network traffic. For example, let's assume there are three different data centers that are active. Let's also assume three physical locations in the United States of east coast, central and west coast. Let's also assume that network traffic on the east coast consists of 5000 sessions, the west coast 8000 and the central 4000. The load balancing array would monitor the different loads and distribute the traffic in an equal load to all three locations while considering the physical distance and quality of the connection. The goal of a load balancing array is to ensure that traffic doesn't overload one part of the enterprise while under-using the rest. This is to maintain quality of service and best utilize all deployed equipment in the most efficient manner possible.

Cellular transceivers 410a-b are mounted to tower 415 for receiving and transmitting cellular signals to mobile devices 105 positioned within range. A satellite transceiver 420 complies with OSI standard for a packet network, sending and receiving data to mobile device 105. Server 110 is shown as a single server in FIG. 4. However, it should be understood that system 300 is scalable and the number of servers 110 may be increased to handle the added load of more calls from multiple mobile devices 105. In addition, the number of points on system 300 configured as shown may be incremented to add coverage on the system.

Figure 5:
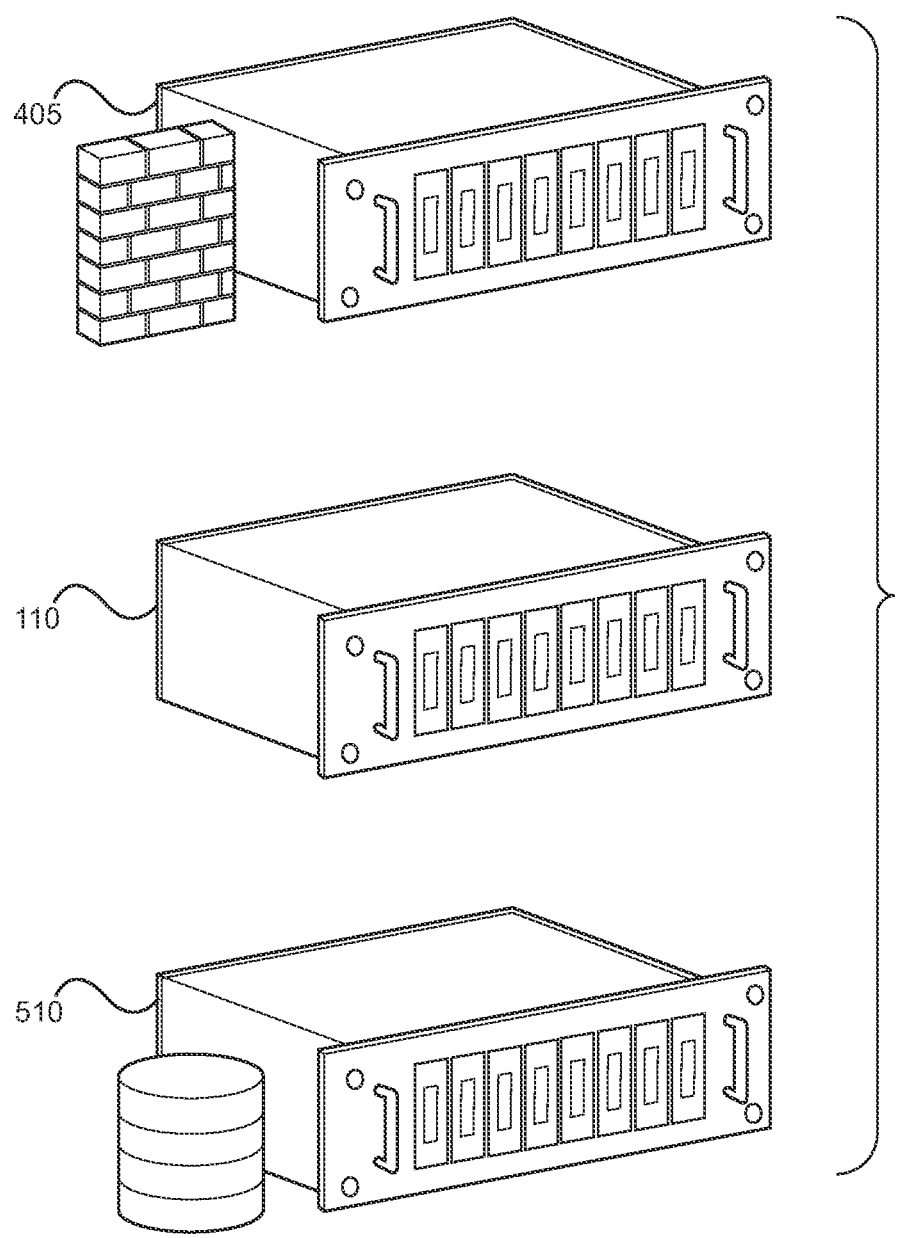
FIG. 5 shows the server components implemented in a system and method for transferring calls without interruption between a cellular network and a WiFi network.
Figure 6:
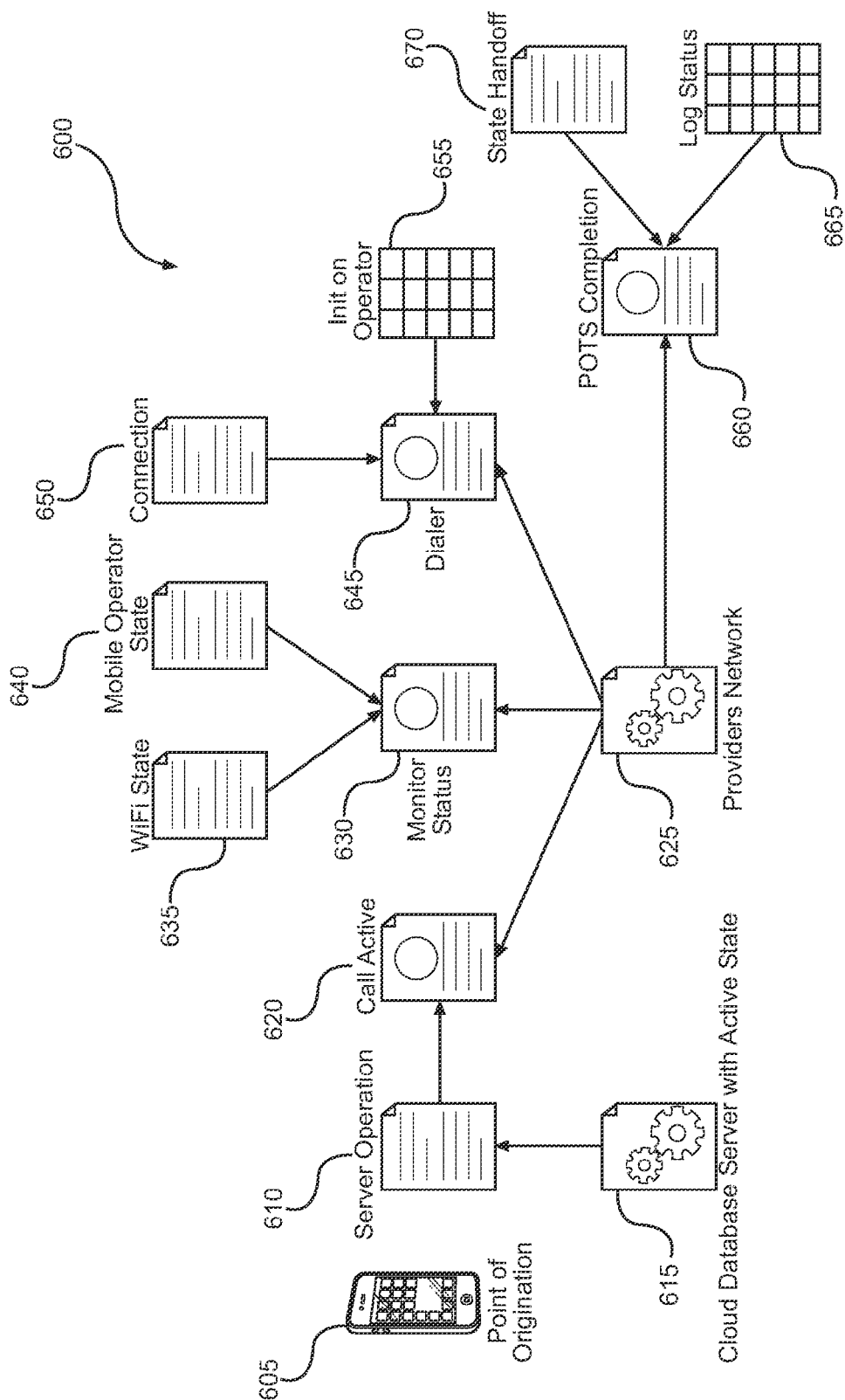
FIG. 6 is a state diagram for a system and method for transferring calls without interruption between a cellular network and a WiFi network.

FIG. 5 shows the server components implemented in system 300. Load balancing array 405 may be, for example, a F5 network "BIG-IP" or equivalent as defined at https://f5.com/glossary/load-balancer. Back end server 110, which may be, for example a Dell PowerEdge R520 or equivalent is typically configured to run Linux operating system and is used to complete operations as outlined above. Other server types and operating systems may be also be used in system 300 without altering the operation of the invention. And, a structured query language database 510 may be housed, for example, on a Dell PowerEdge R520 or equivalent and is configured to perform the following operations:

Maintain a list of active subscribers
Maintain a session ID
Maintain a status of the state of the session/call
Maintain an error log and
Maintain routing information FIG. 6 is a state diagram 600 for system 300 showing the operation of the method for transferring calls without interruption between cellular network 305 and WiFi network 310. The operations shown in FIG. 6 begin with the Point of Origination 605 and proceeds to completion at Plain Old Telephone Service ("POTS") 660. Point of origination 605 is a call originating on mobile device 105.

Server operation 610 has already been described with respect to FIG. 4 and FIG. 5 above and is a network configured to accept the handoff of a call from cellular network 305.

Cloud database with active state 615 is described with respect to FIG. 5 above and is a network connectable to mobile device 105 by a WiFi router.

Call Active 620 refers to the state of the user call on cellular network 305. When the call is flagged as active, the signal detection component will attempt to hand off the call from cell network 305 to WiFi network 310.

Providers network 625 is the application programming interface ("API") to each of the mobile providers systems. An initial version might include the largest four U.S. Providers (AT&T, T-Mobile, Verizon and Sprint), however, the system is compatible with all digital mobile providers. Providers network 625 is the portion of the installed application 205 that performs the switch between the cellular network 305 and WiFi network 310. When a call is initiated, the direct inward dialing ("DID")/phone number is stored in active phone memory. This number is submitted to cellular network 305 so as the call is passed between the two systems it can be maintained without having to reinitiate the call. When the call is handed off via the Signal Seeker, a mode is imitated as outlined with respect to the description of monitor status block 630 below. This function allows a call to be initiated via WiFi 310 and remain live when switching to cellular network 305.

Monitor status block 630 maintains the active and passive states of a current call. This is logged via the process as outlined below with respect to log status block 660. The information provided to the logging function originates here.

WiFi State 635 and Mobile Operator State 640 feed Monitor Status 630 which operates along with call active 620 to maintain the status of the active call.

Dialer 645 interfaces with the dial function of mobile device 105 (when present) or presents a substitute on devices that do not have mobile calling capability such as a personal computer. Connection 650 shows the established connection to either WiFi network 310 or cell network 305.

Init on Operator block 655 is the status that is logged with the database 510 shown in FIG. 5. More specifically, this is the active status of the mobile provider, the current call status, the session identifier, the DID of the device, the international mobile equipment identity ("IMEI") (or equivalent serial number) of the device and the call duration.

POTS (Plain Old Telephone Service) Completion block 660 references the ability for a WiFi initiated call to be compatible with the standard telephone network. Completion allows a call initiated via the application to connect, ring and be active to standard land line phones.

Log status block 665 maintains the active status of the session. For example, if a call is initiated via WiFi 310 to a land line phone, the WiFi status, the land line status and the telco information are maintained at log status 665 in real-time.

State Handoff 670 physically transfers the application call from WiFi to the mobile network operator and back, in any order.

Figure 7:
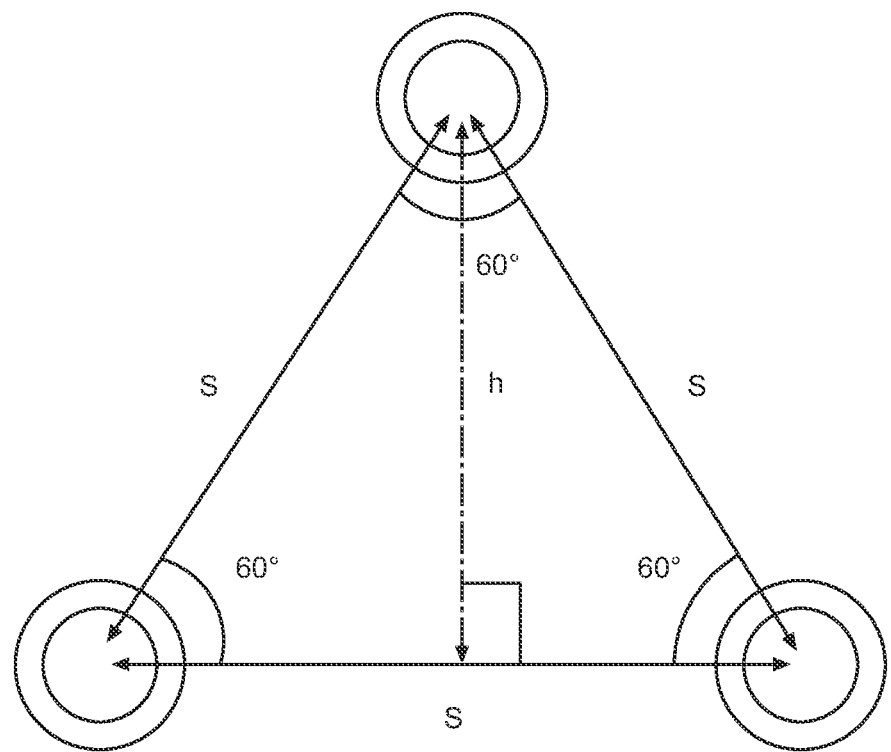
FIG. 7 is a plan diagram showing the physical boundaries for coverage of the system of the invention.

FIG. 7 is a plan diagram showing the physical boundaries for coverage of the WiFi network 310 where: (a) each side measurement, "s," defines the boundaries where the signal occurs to trigger a cutover to or from WiFi; (b) a triangulated measurement "a" is the internal area in $m^2$ within the boundaries and is defined based on the expression $2\pi$ depending on the nature of the WiFi signal and the cellular signal. The variable "s" is calculated using the equation:

$$s = a \div \sin 60°$$

This equation shows the actual functions and conditions under which the Signal Seeker signal detection component operates.

As defined in the equation, the procedure is initiated when a user places a call on cellular network 305. Based on the criteria in the equation above, the call will be completed with cell network 305 when available and via WiFi 310 when it is not.

Based on the criteria below, when WiFi network 310 is active the call will be transferred to WiFi upon meeting the conditions of the equation above depending on the variables of signal strength and connection times. The range of the signal strength has H (high point) at approximately 1.5 db and L (low point) at approximately 1.8 db with a default of approximately 1.5 db. The connection time is in the approximate range between 3 seconds and 5 seconds with a default of approximately 5 seconds. Both options may be adjusted from the interface by the user in the application.

The system will also check for ports and other details per the equation above. In the event that the Layer 3 TCP cellular service 305 is not available, the call will complete and operate via the WiFi network 310. Wireless system uses a circular boundary with signal and deployment strengths outlined in this equation.

In practice, when a user enters the signal range of a WiFi network the device will connect automatically through existing means. The problem that is solved is that when a user is on the edge of a WiFi network the device will have a default behavior of connecting to the WiFi, and disconnecting from it becomes a problem that is currently present or that will be consistent in the current position. The problem can be stated as a simple equation: X as X=DT (where D is distance and T is threshold) to create a "buffer" zone for the WiFi network to be in operation, but the call to still be on the mobile network. The "buffer" zone is what is referred to as tolerance. When inside this zone, the call automatically switches.

The solution can be implemented using a single triangular range as shown in FIG. 7, or it can include multiple triangular ranges layered on top of each other where different WiFi bands are present. In that case, multiple "X" variables are determined based on different, layered distances "D" and thresholds "T." So there would be an $X_1$, $D_1$ and $T_1$ defined to be in a relationship as $X_1=D_1T_1$ and $X_2$, $D_2$ and $T_2$ defined to be in a relationship expressed as $X_2=D_2T_2$.

On the exit of a WiFi network, the signal is checked against "H" and "L," and the measured level is added to the conditions and that is why this calculation is a function for a triangulation instead of a circle. The same logic as above is applied in reverse when the user is already on WiFi to give the user a tolerance ("exit buffer" zone) when leaving the WiFi coverage area. This ensures that the call is not dropped and quality of service is maintained.

As an example, where a=39.75 m² and it is known that the sin 60° is 0.866, s=45.9 meters. Therefore, it is necessary to expand the inter-access point spacing from 42.7 meters to 45.9 meters in order to move both the top and bottom rows of outermost access points to the actual building perimeter. As this represents a relatively minor increase in inter-access point spacing, it should be easily accommodated by a correspondingly minor increase in transmit power, if any at all. In the next step, the new cell size is determined that would be required to support the recommended levels of overlap, given the newly calculated inter-access point spacing.

Using this new value for Signal Seeker's inter-access point spacing, the −67 dBm cell signal boundary is first calculated with a 15% cell-to-cell overlap for 802.11a. The −67 dBm cell signal boundary with a 20% cell-to-cell overlap is the calculated for the legacy data and voice devices that will be using 802.11bg. With the assumption that the radii of any two adjacent access point cells are equal (that is R1=R2=R), the equation for the area of a circle-circle intersection can be used as the basis for this calculation. To determine the cell radius given that the inter-access point separation and the percentage of overlap are known, the following equation is used:

$$O\pi R^2 = 2R^2 \arccos\left(\frac{d}{2R}\right) - \frac{1}{2}d\sqrt{4R^2 - d^2}$$

where:
O=the desired overlap percentage divided by 100
d=the inter-access point distance in meters
R=the cell radius in meters Either 15 (for 802.11a) or 10 (for 802.11bg) is substituted as the percentage of overlap O, and 45.9 meters is substituted for the inter-access point distance d. Solving for R as an approximate root of the function shown above, it is determined that the cell radii is equal to 30.88 meters for a 15% cell-to-cell overlap using 802.11a and 33.4 meters for a 20% cell-to-cell overlap using 802.11bg.

At this point, the information necessary to calculate the access point transmission power settings to achieve the desired cell signal boundaries are known. A calculation is performed using a form of the equation presented earlier to calculate receive signal strength (TXPOWER) from knowledge of the reference path loss, path loss exponent, transmit power and various miscellaneous receive and transmit gains and losses. As it is the transmit power (TXPOWER) of the access points that is required for the calculation, and not the receive signal strength, a modified form of the equation is used as follows:

$$TX_{POWER} = RX_{POWER} + \text{Loss}_{TX} - \text{Gain}_{TX} + PL_{METER} + 10\log D^n + s - \text{Gain}_{RX} + \text{Loss}_{RX}$$

where:
Transmission losses due to cables, connectors, etc ($\text{Loss}_{TX}$ and $\text{Loss}_{RX}$) are equal to 0 dB
0 dB shadow fading standard deviation
Receive antenna gain for our legacy 2.4 GHz data client devices of 0 dBi Substituting the appropriate values along with an expectation of a −67 dBm minimum receive signal strength (RXPOWER) for both 802.11a 802.11bg, as well as the appropriate antenna gains, a cell radius in meters, an estimated path loss exponent n of 3.5 and the reference path losses, we obtain the following results:

802.11bg:

$$TX_{POWER} = -67 \text{ dBm} + 0 - 2.2 \text{ dBi} + 40 \text{ dB} + 10\log(10.18^{3.5}) - 0 + 0 =$$
$$-29.2 + (10 * 3.527)$$

802.11a:

$$TX_{POWER} =$$
$$-67 \text{ dBm} + 0 - 3.5 \text{ dBi} + 46 \text{ dB} + 10\log(9.41^{3.5}) - (-3.0) + 0 =$$

-continued $$TX_{POWER} = \frac{-24.5 + (10 * 3.408) + 3}{+12.58 \text{ dBm}},$$

or approximately +14 dBm

Note that these power levels have been rounded upward to the next available transmit power increment available on the AP1240AG access point. Since this is +1.93 dBm higher than the required transmit power to achieve a recommended 20% overlap goal at a cell signal boundary of −67 dBm, it is expected that the overlap will exceed the 20% target. This is acceptable, as the 20% overlap is a minimum target. Similarly, for 802.11a the access point transmit power level of +14 dBm is +1.42 dBm higher than what is required to achieve the recommended 15% overlap, once again resulting in more overlap between cells than expected.

In this particular case, the option to expand an inter-access point separation is an acceptable alternative. Due to the increase in the inter-access point separation (from 42.7 meters to 45.9 meters), a +3 dBm increase is required to both an 802.11a and 802.11bg access point transmit power settings in order to remain in strict compliance with calculated requirements. Despite the increase in access point transmit power level, additional transmit power is left in reserve on both bands to address potential coverage holes or other anomalies that could occur due to changes in the environment. If this had not been the case, it would have been necessary to proceed with a second option which entails contracting inter-access point spacing and introducing a sixth row of access points. The main differences in the calculations would be to divide the size of the floor by five (instead of four) rows of equilateral triangular formations. This would have resulted in a smaller formation height, a smaller inter-access point separation, and therefore, smaller cell-to-cell radii and lower transmit powers.

Signal Seeker will adhere to a formula to trigger handoff functions at a ratio of 1.6-1.8 db sustained for 5 seconds.

While the invention has been described with respect to the figures, it will be appreciated that many modifications and changes may be made by those skilled in the art without departing from the spirit of the invention. Any variation and derivation from the above description and drawings are included in the scope of the present invention as defined by the claims.

What is claimed is:

1. A system to transfer calls without interruption between a cellular network and a WiFi network, comprising:
  a wireless cellular network for carrying cellular communication packets between at least two devices, at least one of which is a mobile device;
  a WiFi network that is separate from the cellular network and that carries communications between at least two devices, at least one of which is a mobile device;
  a server connected to the WiFi network for controlling communication traffic on the WiFi network;
  a mobile device having a network detector, the mobile device being configured to connect to the cellular network and wirelessly connect to the WiFi network simultaneously,
  wherein upon the network detector detecting a WiFi signal within a set of boundaries and of a preset strength threshold defined by an equation s=a÷sin 60° where "s" is signal strength and "a" is an internal area within the set of boundaries, the mobile device routes communications over the WiFi network;
  wherein, upon the network detector detecting the WiFi signal of the preset strength threshold, the mobile device routes communications over the cellular network; and
  wherein the mobile device switches automatically between the cellular network and the WiFi network depending on detection of a WiFi signal of the preset strength threshold.

2. The system of claim 1 wherein the mobile device maintains connection to the WiFi network and defaults to route communications over the WiFi network where "s" is at or above a preselected strength.

3. The system of claim 1 wherein the network detector is configured to detect a second WiFi signal type of the preset strength threshold, and wherein, upon the network detector detecting the WiFi signal, the second WiFi signal and the cellular network simultaneously, the network detector compares strengths of the WiFi signal and the second WiFi signal, and if one or both of the signals exceeds the preset strength threshold, the mobile device routes communications in a priority of (a) a stronger WiFi signal exceeding the preset strength; (b) a WiFi signal exceeding the preset strength; or (c) a cellular signal where neither WiFi signal exceeds the preset strength.

4. A method of transferring calls without interruption between a cellular network and a WiFi network, comprising:
  providing a wireless cellular network for carrying cellular communication packets between at least two devices, at least one of which is a mobile device;
  providing a WiFi network that is separate from the cellular network and that carries communications between at least two devices, at least one of which is a mobile device;
  connecting a server to the WiFi network that controls communication traffic on the WiFi network;
  providing a mobile device having a network detector, the mobile device being cellularly connectable to the cellular network and wirelessly connectable to the WiFi network simultaneously;
  wherein upon the network detector detecting a WiFi signal within a set of boundaries and of a preset strength threshold defined by an equation s=a÷sin 60° where "s" is signal strength and "a" is an internal area within the set of boundaries, the mobile device routes communications over the WiFi network;
  wherein, upon the network detector not detecting the WiFi signal of the preset strength threshold, the mobile device routes communications over the cellular network; and
  wherein the mobile device switches automatically between the cellular network and the WiFi network depending on detection of a WiFi signal of the preset strength threshold.

5. The method of claim 4 wherein the mobile device maintains connection to the WiFi network and defaults to route communications over the WiFi network where "s" is at or above a preselected strength.

6. The system of claim 4 wherein the network detector is configured to detect a second WiFi signal type of the preset strength threshold, and wherein, upon the network detector detecting the WiFi signal, the second WiFi signal and the cellular network simultaneously, the network detector compares strengths of the WiFi signal and the second WiFi signal, and if one or both of the signals exceeds the preset strength threshold, the mobile device routes communications in a priority of (a) a stronger WiFi signal exceeding the preset strength; (b) a WiFi signal exceeding the preset strength; or (c) a cellular signal where neither WiFi signal exceeds the preset strength.

\* \* \* \* \*